United States Patent
Gorodissky et al.

(10) Patent No.: US 10,686,823 B2
(45) Date of Patent: Jun. 16, 2020

(54) SYSTEMS AND METHODS FOR DETECTING COMPUTER VULNERABILITIES THAT ARE TRIGGERED BY EVENTS

(71) Applicant: XM Ltd., Hertzelia (IL)

(72) Inventors: Boaz Gorodissky, Hod-Hasharon (IL); Adi Ashkenazy, Tel Aviv (IL); Ronen Segal, Hertzelia (IL)

(73) Assignee: XM Cyber Ltd., Hertsliya (IL)

( * ) Notice: Subject to any disclaimer, the term of this patent is extended or adjusted under 35 U.S.C. 154(b) by 295 days.

(21) Appl. No.: 15/940,376

(22) Filed: Mar. 29, 2018

(65) Prior Publication Data

US 2018/0219909 A1    Aug. 2, 2018

Related U.S. Application Data

(63) Continuation-in-part of application No. 15/911,168, filed on Mar. 4, 2018, now Pat. No. 10,038,711, which is a continuation of application No. 15/874,429, filed on Jan. 18, 2018, application No. 15/940,376, filed on Mar. 29, 2018, which is a continuation-in-part of application No. 15/874,429, filed on Jan. 18, 2018.

(60) Provisional application No. 62/482,535, filed on Apr. 6, 2017, provisional application No. 62/451,850, filed on Jan. 30, 2017.

(51) Int. Cl.
*H04L 29/06* (2006.01)
*H04L 12/26* (2006.01)
*H04L 12/24* (2006.01)

(52) U.S. Cl.
CPC ........ *H04L 63/1433* (2013.01); *H04L 41/048* (2013.01); *H04L 43/50* (2013.01); *H04L 63/30* (2013.01); *H04L 63/1416* (2013.01); *H04L 63/1466* (2013.01)

(58) Field of Classification Search
None
See application file for complete search history.

(56) References Cited

U.S. PATENT DOCUMENTS

| | | | |
|---|---|---|---|
| 10,182,040 B2 * | 1/2019 | Hu | G06F 21/602 |
| 2003/0140223 A1 * | 7/2003 | Desideri | H04L 63/20 713/153 |
| 2004/0095907 A1 * | 5/2004 | Agee | H04B 7/0417 370/334 |

(Continued)

OTHER PUBLICATIONS

Goel, Jai Narayan et al. Ensemble Based Approach to Increase Vulnerability Assessment and Penetration Testing Accuracy. 2016 International Conference on Innovation and Challenges in Cyber Security (ICICCS-INBUSH). https://ieeexplore.ieee.org/stamp/stamp.jsp?tp=&arnumber=7542303 (Year: 2016).*

(Continued)

*Primary Examiner* — Jeremiah L Avery
(74) *Attorney, Agent, or Firm* — Marc Van Dyke; Momentum IP Group

(57) ABSTRACT

Methods and systems for carrying out campaigns of penetration testing for discovering and reporting security vulnerabilities of a networked system, the networked system comprising a plurality of network nodes interconnected by one or more networks.

21 Claims, 5 Drawing Sheets

(56) References Cited

U.S. PATENT DOCUMENTS

2005/0100157 A1\* 5/2005 Gray .................... H04M 3/436
379/265.01
2014/0328423 A1\* 11/2014 Agee .................. H04W 52/265
375/267
2017/0214701 A1\* 7/2017 Hasan ................ H04L 63/1408

OTHER PUBLICATIONS

Zhao, Jianming et al. Penetration Testing Automation Assessment Method Based on Rule Tree. 2015 IEEE International Conference on Cyber Technology in Automation, Control and Intelligent Systems (CYBER). https://ieeexplore.ieee.org/stamp/stamp.jsp?tp=&arnumber=7288225 (Year: 2015).\*

Hudic, Aleksandar et al. Towards a Unified Penetration Testing Taxonomy. 2012 International Conference on Privacy, Security, Risk and Trust and 2012 International Conference on Social Computing. https://ieeexplore.ieee.org/stamp/stamp.jsp?tp=&arnumber=6406329 (Year: 2012).\*

Qiu, Xue et al. Automatic generation algorithm of penetration graph in penetration testing. 2014 Ninth International Conference on P2P, Parallel, Grid, Cloud and Internet Computing. https://ieeexplore.ieee.org/stamp/stamp.jsp?tp=&arnumber=7024641 (Year: 2014).\*

Hemanidhi, Aniwat et al. Network Risk Evaluation from Security Metric of Vulnerability Detection Tools. TENCON 2014—2014 IEEE Region 10 Conference. https://ieeexplore.ieee.org/stamp/stamp.jsp?tp=&arnumber=7022358 (Year: 2014).\*

Bechtsoudis, A; Sklavos, N. Aiming at Higher Network Security Through Extensive Penetration Tests. IEEE Latin America Transactions vol. 10, Issue: 3. https://ieeexplore.ieee.org/stamp/stamp.jsp?tp=&arnumber=6222581 (Year: 2012).\*

\* cited by examiner

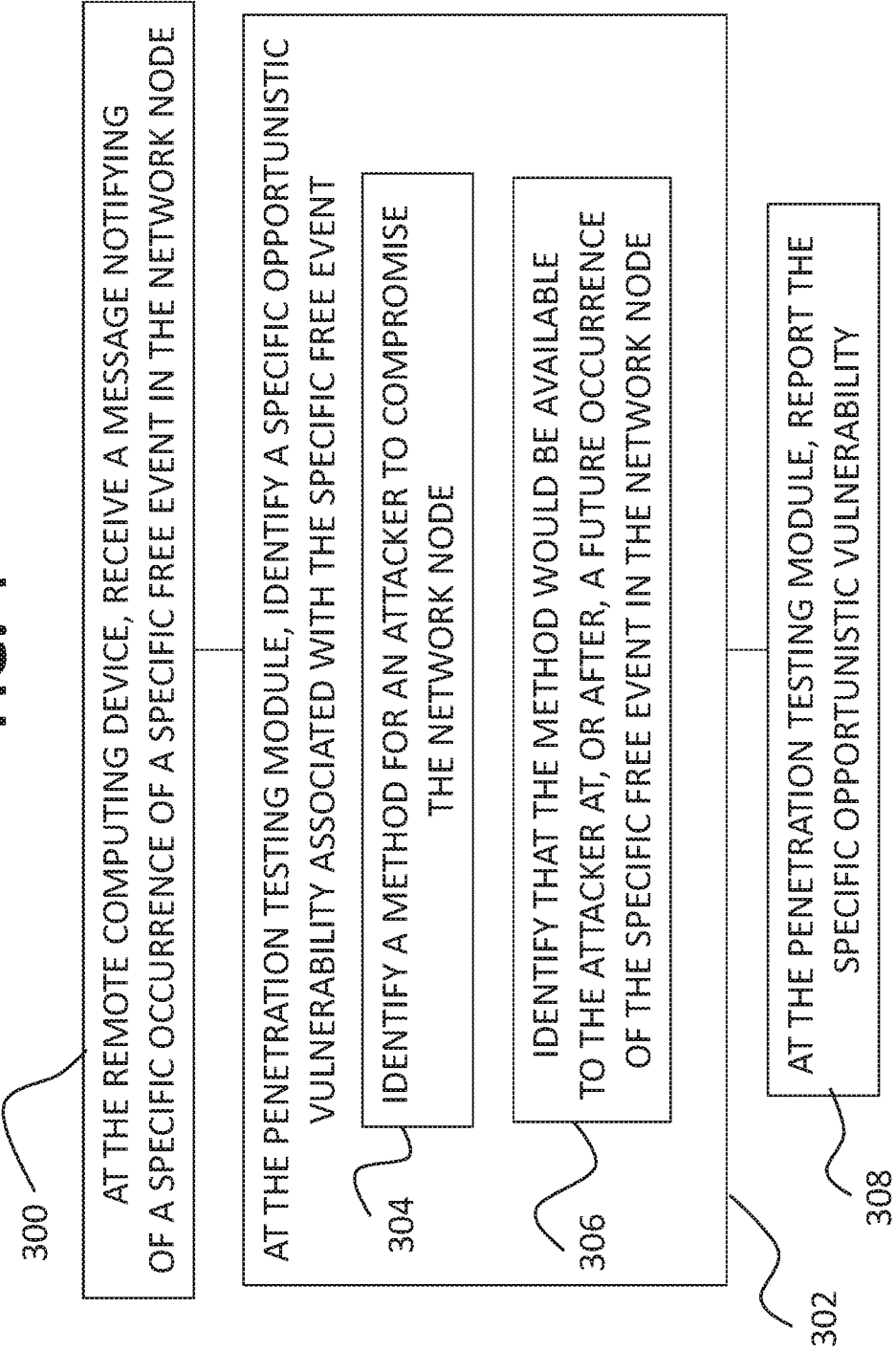

SYSTEMS AND METHODS FOR DETECTING COMPUTER VULNERABILITIES THAT ARE TRIGGERED BY EVENTS

RELATED APPLICATIONS

The present application gains priority from U.S. Provisional Patent Application 62/482,535 filed on Apr. 6, 2017 and entitled "Detecting Computer Vulnerabilities that are Triggered by Events". This patent application is a Continuation In Part of U.S. patent application Ser. No. 15/911,168 filed on Mar. 4, 2018, which is a continuation of U.S. patent application Ser. No. 15/874,429 filed on Jan. 18, 2018, both of which are entitled "Penetration Testing of a Networked System". The present patent application is also a Continuation In Part of U.S. patent application Ser. No. 15/874,429, mentioned above. Both U.S. patent application Ser. Nos. 15/911,168 and 15/874,429 claim the benefit of U.S. Provisional Patent Application No. 62/451,850 filed on Jan. 30, 2017. U.S. patent application Ser. Nos. 15/874,429 and 15/911,168, as well as U.S. Provisional Application Nos. 62/482,535 and 62/451,850 are all incorporated herein by reference in their entirety.

BACKGROUND OF THE INVENTION

There is currently a proliferation of organizational networked computing systems. Every type of organization, be it a commercial company, a university, a bank, a government agency or a hospital, heavily relies on one or more networks interconnecting multiple computing nodes. Failures of the networked computing system of an organization, or even of only a portion of it, might cause significant damage, up to completely shutting down all operations. Additionally, much of the data of the organization, if not all the data, exist somewhere on its networked computing system, including all confidential data comprising the "crown jewels" of the organization, such as prices, details of customers, purchase orders, employees' salaries, technical formulas, etc. Loss of such data or leaks of such data to unauthorized external entities might be disastrous for the organization.

Many organizational networks are connected to the Internet at least through one network node, and consequently may be subject to attacks by computer hackers or by hostile adversaries. Quite often the newspapers report incidents in which websites crashed, sensitive data was stolen, or service to customers was denied, where the failures were the results of hostile penetration into an organization's networked computing system.

Thus, many organizations invest a lot of efforts and costs in preventive means designed to protect their computing networks against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISOs (Computer Information Security Officers) will admit (maybe only off the record), that they don't really know how well they can withstand an attack from a given adversary. The only way to really know the strength and security of a system, is by trying to attack it as a real adversary would. This is known as red-teaming or penetration testing (pen testing, in short), and is a very common approach that is even required by regulation in some developed countries.

Penetration testing requires highly talented people to man the testing team. Those people should be familiar with each and every publicly known vulnerability and attacking method and should also have a very good familiarity with networking techniques and multiple operating systems implementations. Such people are hard to find and therefore many organizations give up establishing their own penetration testing teams and resort to hiring external expert consultants for carrying out that role (or completely give up penetration testing). However, external consultants are expensive and therefore are typically called in only for brief periods separated by long intervals in which no penetration testing is carried out. This makes the penetration testing ineffective, as vulnerabilities caused by new attacks, that appear almost daily, are discovered only months after becoming serious threats to the organization.

Additionally, even rich organizations that can afford hiring talented experts for in-house penetration testing teams do not achieve good protection. Testing for vulnerabilities of a large network containing many types of computers, operating systems, network routers and other devices is both a very complex and a very tedious process. The process is prone to human errors such as missing testing for certain threats or misinterpreting the damages of certain attacks. Additionally, because a process of full testing against all threats is quite long, the organization might again end with a too long discovery period after a new threat appears.

In view of the above deficiencies, automated penetration testing solutions were introduced in recent years by several vendors. These automated solutions reduce human involvement in the penetration testing process, or at least in some of its functions. Some of those systems automatically discover and report vulnerabilities of a networked system, potential damages that might be caused to the networked system, and potential trajectories of attack that may be employed by an attacker.

A penetration testing process involves at least the following main functions: (i) a reconnaissance function, (ii) an attack function, and (iii) a reporting function. The process may also include additional functions, for example a cleanup function that restores the tested networked system to its original state as it was before the test. In an automated penetration testing system, at least one of the above three functions is at least partially automated, and typically two or three of them are at least partially automated.

FIG. 1A (PRIOR ART) is a block diagram of code modules of a typical penetration testing system. FIG. 1B (PRIOR ART) is a related flow-chart.

FIG. 1A shows a typical prior art penetration testing system and its main functions, where in addition to the three main functions listed above there is also an optional cleanup function. Even though the figures show the reconnaissance, attack and reporting functions as operating in strictly sequential order, this is not necessarily so. For example, the attack and the reporting functions may operate in parallel or in an interleaved way, with the reporting function reporting first results obtained by the attack function, while the attack function is working on additional results. Similarly, the reconnaissance and the attack functions may operate in parallel or in an interleaved way, with the attack function detecting a vulnerability based on first data collected by the reconnaissance function, while the reconnaissance function is working on collecting additional data.

A reconnaissance function is the function within a penetration testing system that handles the collection of data about the tested networked system. The collected data may include internal data of network nodes, data about network traffic within the tested networked system, business intelligence data of the organization owning the tested networked system, etc. The functionality of a prior art reconnaissance function can be implemented, for example, by software executing in a server that is not one of the network nodes of the tested networked system, where the server probes the tested networked system for the purpose of collecting data about it.

An attack function is the function within a penetration testing system that handles the determination of whether security vulnerabilities exist in the tested networked system based on data collected by the reconnaissance function. The functionality of a prior art attack function can be implemented, for example, by software executing in a server that is not one of the nodes of the tested networked system, where the server attempts to attack the tested networked system for the purpose of verifying that it can be compromised.

A reporting function is the function within a penetration testing system that handles the reporting of results of the penetration testing system. The functionality of a prior art reporting function may be implemented, for example, by software executing in the same server that executes the functionality of the attack function, where the server reports the findings of the attack function to an administrator or a CISO of the tested networked system.

In FIG. 1A, code for the reconnaissance function, for the attack function, and for the reporting function are respectively labelled as 20, 30 and 40, and are each schematically illustrated as part of a penetration testing system code module (PTSCM) labelled as 10. The term 'code' is intended broadly and may include any combination of computer-executable code and computer-readable data which when read affects the output of execution of the code. The computer-executable code may be provided as any combination of human-readable code (e.g. in a scripting language such as Python), machine language code, assembler code and byte code, or in any form known in the art. Furthermore, the executable code may include any stored data (e.g. structured data) such as configuration files, XML files, and data residing in any type of database (e.g. a relational database, an object-database, etc.).

In one example and as shown in FIG. 1B, the reconnaissance function (performed in step S21 by execution of reconnaissance function code 20), the attack function (performed in step S31 by execution of attack function code 30) and the reporting function (performed in step S41 by execution of reporting function code 40) are executed in strictly sequential order so that first the reconnaissance function is performed by executing code 20 thereof, then the attack function is performed by executing code 30 thereof, and finally the reporting function is performed 40 by executing code thereof.

However, the skilled artisan will appreciate that this order is just one example, and is not a requirement. For example, the attack and the reporting functions may be performed in parallel or in an interleaved way, with the reporting function reporting first results obtained by the attack function, while the attack function is working on additional results.

Similarly, the reconnaissance and the attack functions may operate in parallel or in an interleaved way, with the attack function detecting a vulnerability based on first data collected by the reconnaissance function, while the reconnaissance function is working on collecting additional data.

FIG. 2 illustrates a prior art computing device 110 which may have any form-factor including but not limited to a laptop, a desktop, a mobile phone, a server, a tablet, or any other form factor. The computing device 110 in FIG. 2 includes (i) computer memory 160 which may store code 180; (ii) one or more processors 120 (e.g. central-processing-unit (CPU)) for executing code 180; (iii) one or more human-interface device(s) 140 (e.g. mouse, keyboard, touchscreen, gesture-detecting apparatus including a camera, etc.) or an interface (e.g. USB interface) to receive input from a human-interface device; (iv) a display device 130 (e.g. computer screen) or an interface (e.g. HDMI interface, USB interface) for exporting video to a display device and (v) a network interface 150 (e.g. a network card, or a wireless modem).

Memory 160 may include any combination of volatile (e.g. RAM) and non-volatile (e.g. ROM, flash, disk-drive) memory. Code 180 may include operating-system code—e.g. Windows®, Linux®, Android®, Mac-OS®.

Computing device 110 may include a user-interface for receiving input from a user (e.g. manual input, visual input, audio input, or input in any other form) and for visually displaying output. The user-interface (e.g. graphical user interface (GUI)) of computing device 110 may thus include the combination of HID device 140 or an interface thereof (i.e. in communication with an external HID device), display device 130 or an interface thereof (i.e. in communication with an external display device), and user-interface (UI) code stored in memory 160 and executed by one or more processor(s) 120. The user-interface may include one or more GUI widgets such as labels, buttons (e.g. radio buttons or check boxes), sliders, spinners, icons, windows, panels, text boxes, and the like.

In one example, a penetration testing system is the combination of (i) code 10 (e.g. including reconnaissance function code 20, attack function code 30, reporting function code 40, and optionally cleaning function code 50); and (ii) one or more computing devices 110 which execute the code 10. For example, a first computing device may execute a first portion of code 10 and a second computing device (e.g. in networked communication with the first computing device) may execute a second portion of code 10.

A prior art penetration testing system may be an actual attack penetration testing system that carries out penetration testing by accessing and attempting to attack the tested networked system. Such a system actually accesses the tested networked system during the test, and does not limit itself to simulation. This includes:

(i) collecting data by the reconnaissance function about the tested networked system and its components, by actively probing them. The probing is accomplished by sending queries or other messages to one or more network nodes of the tested networked system, and then deducing information about the tested networked system from the received responses or from network traffic triggered by the queries or the messages. The reconnaissance function may be fully implemented by software executing outside the tested networked system or by a combination of such software and software executing in one or more network nodes of the tested networked system that analyzes network traffic and network packets of the tested networked system.

(ii) verifying that the tested networked system can be compromised by actively attempting to compromise it and checking if it was indeed compromised. This implies that, as a side effect of executing an actual attack penetration test, the tested networked system might be actually compromised. Typically, prior art actual attack penetration testing systems include a function of cleanup and recovery activated at the end of the test, in which any compromising operation that was performed during the test is undone.

A prior art penetration testing system may be a simulated penetration testing system that carries out penetration testing while avoiding disturbance to the tested networked system and specifically avoiding any risk of compromising it. This implies, among other things, that (i) no installation of software agents of any kind on network nodes of the tested networked system is allowed, and (ii) whenever there is a need to verify that the tested networked system can be compromised by an operation or a sequence of operations, the verification is done by simulating the results of that operation or sequence of operations or by otherwise evaluating them, without taking the risk of actually compromising the tested networked system. Some prior art simulated penetration testing systems implement the simulation by duplicating all or parts of the hardware and software of the tested networked system. As such, when there is a need for verifying that an operation or a sequence of operations compromises the tested networked system, this is accomplished by attacking the duplicated system without risking the tested networked system. While this implementation achieves the goal of avoiding the risk of not compromising the tested networked system, it is highly expensive and is difficult to implement accurately, and is therefore rarely used.

The Problem to Solve

Prior art automated penetration testing systems can successfully detect many types of vulnerabilities in the tested networked system. However, they have difficulty in detecting an important class of vulnerabilities, termed herein "opportunistic vulnerabilities".

An "opportunistic vulnerability" is a security vulnerability that becomes available to attackers only after an occurrence of a specific event. In many cases, an opportunistic security vulnerability remains available to attackers only for a limited time interval, and once that time interval is over, the vulnerability is no longer available to them. However, in some cases an opportunistic vulnerability remains available to attackers with no time limit.

In some cases the availability of the vulnerability to the attackers is created by the occurrence of the event—for example when a transmission of a network message creates the weakness making an attack possible. In other cases, the availability of the vulnerability to attackers is not created by the occurrence of the event, but rather exists beforehand, and the occurrence of the event makes the existing vulnerability known to the attackers.

A specific event that triggers the availability of a specific opportunistic vulnerability is said to be an event "associated with" that specific opportunistic vulnerability, and the specific opportunistic vulnerability is said to be an opportunistic vulnerability "associated with" that specific event.

A specific event that triggers the availability of a specific opportunistic vulnerability may trigger that availability unconditionally. That is—the specific opportunistic vulnerability will become available to attackers following every occurrence of the specific event. However, it may also be the case that the specific event might sometimes trigger the specific opportunistic vulnerability and sometimes not trigger it, depending on some condition.

An event is said to be associated with an opportunistic vulnerability and an opportunistic vulnerability is said to be associated with an event if the event may trigger the opportunistic vulnerability, regardless if the triggering relation is conditional or unconditional. In the first case we say that the event is "unconditionally associated" with the opportunistic vulnerability, and in the second case we say that the event is "potentially associated" or "conditionally associated" with the opportunistic event. As a result of the above, detecting an event that is associated with an opportunistic vulnerability does not necessarily imply that the vulnerability will be available to the attacker in a future occurrence of the event. In order to conclude that the opportunistic vulnerability will indeed be available to the attacker for a future occurrence of the event, it must be determined that the condition enabling the triggering of the vulnerability by the event (if such exists) is satisfied.

A time interval during which a specific opportunistic vulnerability is available to attackers (if such limiting time interval exists for that specific opportunistic vulnerability) is said to be a time interval "associated with" that specific opportunistic vulnerability.

A time interval associated with an opportunistic vulnerability may be of a fixed length for all occurrences of the event associated with that opportunistic vulnerability, or it may have different length in different occurrences of the associated event and be terminated by the occurrence of another event that makes the use of the vulnerability to attackers no longer possible.

As one example of an opportunistic vulnerability, it might be the case that a bug in a storage driver causes a buffer overflow to occur in a certain network node whenever a USB storage device in inserted into a USB port of the network node, if the volume name of the storage device is longer than a certain length. Thus, the event of the insertion of the storage device having a volume name of a specific length may create an opportunity which attackers may exploit for compromising that network node, an opportunity that ceases to exist after any access to the inserted storage device.

Another example of an opportunistic vulnerability is when a transmission by a network node of a certain message type of a certain network protocol creates an opportunity for attackers to respond with a malicious reply message, which leads to compromising of the network node. In this example, the opportunity for the attacker is triggered by the event of transmission of the first message and is only available to the attacker until a true addressee of the first message responds to the message.

Many prior art penetration testing systems detect vulnerabilities by blindly attempting to compromise a network node without having certainty, in advance, whether the attempted vulnerability indeed compromises the attacked node. Clearly, vulnerabilities of the opportunistic type create a problem for such penetration testing systems. Since an event triggering the opportunistic vulnerability may occur at random, and the window of opportunity for attackers to exploit the opportunistic vulnerability may be limited, it is quite likely that an attempted "blind attack" by a penetration testing system will fail to detect the vulnerability. This is particularly true when the window of opportunity is short, as is the case in many real-life opportunistic vulnerabilities, including many of the examples provided herein. Thus, the prior art testing system would not detect that opportunistic vulnerability, while in reality the network node is subject to a threat of being compromised by a sophisticated attacker that knows how to time his attack to occur within the window of opportunity opened by the triggering event. Such an attacker might lay dormant while monitoring the network node for an occurrence of the triggering event, and upon detection of such an event, may exploit the newly created opportunistic vulnerability while the window of opportunity is still open.

Even penetration testing systems that use simulation instead of actual attacks face difficulties when trying to detect opportunistic vulnerabilities. In order to conclude that a given network node is prone to a given opportunistic vulnerability, it is necessary to determine that the event associated with the opportunistic vulnerability that triggers the vulnerability to occur may actually occur in the given network node. For example, if the triggering event of an opportunistic vulnerability is a transmission of a certain type of message of a certain network protocol out of the given network node, it might be the case that the given network node, even though theoretically prone to that vulnerability, in reality never uses the certain network protocol or never uses the certain type of message triggering the vulnerability. It may be possible to make an educated guess by the penetration testing system as to whether the triggering message is in actual use based on the applications installed in the network node and what versions they are, but this is quite difficult to do, and even under best case circumstances does not provide certainty.

The problems faced by prior art penetration testing systems when dealing with opportunistic vulnerabilities are even more severe when the event associated with the opportunistic vulnerability is a free event.

A "free event of a network node" is an event occurring in a network node of the networked system, which event is initiated in and by the node in which it occurs, and is not directly caused or triggered by an entity outside that node.

An occurrence of a free event in a network node may be triggered by:
  i. A user of the node—for example by the user inserting a USB thumb drive or submitting a query to a web server.
  ii. An operating system of the node—for example, by the operating system sending a request message according to the ARP (Address Resolution Protocol) protocol in order to find out which MAC (Media Access Control) address (e.g. Ethernet address) corresponds to a given IP address.
      According to the ARP protocol, a first network node that wants to communicate with a second node located on the same local network, but knows only the IP address of the second node and not its MAC address (i.e. the required translation of the second node's IP address to its MAC address is not found in the address matching cache of the first node), submits an ARP request message containing its own MAC and IP addresses and the known IP address of the second node. In response, the second node is expected, when identifying its IP address in the ARP request message, to send an ARP reply message containing its own MAC and IP addresses as well as the MAC and IP addresses of the first node that sent the ARP request. Upon identifying that the reply is addressed to it, the first node can extract from the reply the previously unknown MAC address of the second node, store it in its address matching cache for later use, and use the MAC address for communicating with the second node.
  iii. An application executing on the node—for example, a browser sending a message according to the WPAD (Web Proxy Auto-Discovery) protocol in order to find out a configuration file that determines a proxy server for a target URL.
      According to the WPAD protocol, a network node that needs to determine the right proxy server for a target URL submits a WPAD message according to the DHCP (Dynamic Host Configuration Protocol) or the DNS (Domain Name System) protocols. The node expects to receive back an answer from a DHCP server or a DNS server containing a URL directing it to a configuration file, which in turn directs the node to the right proxy server for the target URL.

As elaborated herein below, all the above free event examples are associated with opportunistic vulnerabilities. In other words, each of the free events of the above examples may trigger a security vulnerability that creates an opportunity for a hostile attacker to compromise the network node, where the vulnerability becomes available to the attacker after the occurrence of the free event and because of it.

For example, when a user submits a query to a web server within the networked system that is already compromised by the attacker, the attacker can use the opportunity to compromise the node making the submission. The web server, which is under control of the attacker, may construct an answer page (for example an HTML page) that contains malicious code, that when rendered by the browser of the querying node compromises that node.

As another example, when an operating system of a first node transmits into the network an ARP request message asking for the MAC address of a second node having a given IP address, a third node, that is under the control of an attacker, might use the opportunity to perform "ARP spoofing". This may be accomplished by the third node responding to the ARP request message before the true addressee of the message (the second node) does so. The false response provided by the third, compromised, node will be a formally-valid ARP reply message that includes a false MAC address belonging to the third node, or to another compromised node. As a result, the false MAC address will be used by the first node for communicating with what it believes to be the second node, while in reality the first node will be communicating with a compromised node which is controlled by the attacker. This might lead to a successful denial-of-service, man-in-the-middle, or session-hijacking attack, thus compromising the first node by the attacker.

As still another example, when a browser running on a first node transmits into the network a WPAD message asking to determine a proxy server for a target URL to which it wants access, a second node that is under the control of the attacker might use the opportunity and respond to the message, before any valid addressee of the message (which is a valid DHCP or DNS server) does so. This false response might include a false URL leading to a false configuration file that in turn determines a false proxy server that is under the control of the attacker. From now on, all communications the first node believes it is directing to the target URL are actually sent to the false proxy server, which is controlled by the attacker. As in the previous example, this might lead to compromising of the first node by the attacker.

As still another example, when a user inserts a USB thumb drive into a USB port of a first node, it may be determined that the currently inserted USB thumb drive is the same device that was previously detected being inserted into a USB port of a second network node (i.e. the same device serial number is detected in both cases) that is already compromised by an attacker. This finding implies that the user may be moving the USB thumb drive back and forth between the two nodes. The attacker may rely on this finding to compromise the first node, by making the second node download a malicious file onto the USB thumb drive the next time it is inserted into the second node, such that when the USB thumb drive will later be inserted into the first node, the first node will be compromised by the poisoned file.

In addition to the difficulties explained above for all opportunistic vulnerabilities, additional difficulties exist when a prior art penetration testing system has to detect an opportunistic vulnerability associated with a free event, because the triggering event is a free event. The additional difficulties arise from the fact that free events are asynchronous relative to the testing process, and cannot be generated or caused from outside of the targeted network node.

Additional difficulties are caused to prior art penetration testing systems when these have to detect an opportunistic vulnerability associated with an event that is an internal event of a network node. The additional difficulties arise from the fact that internal events are, by their nature, impossible to directly detect by software executing on a remote computing device that is separate from the targeted network node.

Thus, there is need in the art for an automatic penetration testing solution that efficiently and correctly handles opportunistic vulnerabilities, and especially opportunistic vulnerabilities that have free events associated with them.

SUMMARY OF THE INVENTION

Some embodiments of the invention relate to methods and systems for detecting opportunistic vulnerabilities in a network node of a networked system.

According to an aspect of an embodiment of the invention, there is provided a method for discovering and reporting a security vulnerability of a networked system by a penetration testing system, the networked system including a plurality of network nodes interconnected by one or more networks, wherein the penetration testing system includes (i) a reconnaissance agent software module, that (A) can be installed on one or more network nodes of the plurality of network nodes, and (B) when installed on a network node of the plurality of network nodes, is operable to detect at least some free events occurring in the network node on which it is installed and to transmit data about occurrences of the at least some free events to a remote computing device, and (ii) a penetration testing software module installed on the remote computing device and operable to communicate with at least one of the plurality of network nodes on which the reconnaissance agent software module is installed, the method including:
a) receiving, by the penetration testing software module installed on the remote computing device, a message from a first network node on which the reconnaissance agent software module is installed, the message notifying the remote computing device of a specific occurrence of a specific free event in the first network node, wherein the message originates from the reconnaissance agent software module installed on the first network node, and wherein the specific free event is one of:
  i) sending a network message out of the first network node caused by a command from a user of the first network node;
  ii) sending a network message out of the first network node caused by an operating system of the first network node;
  iii) sending a network message out of the first network node caused by a software application installed on the first network node;
  iv) mounting a storage volume onto the first network node; and
  v) physically attaching a physical device to the first network node;
b) identifying, by the penetration testing software module and based on the received message, a specific opportunistic vulnerability with which the specific free event is associated, wherein the identifying of the specific opportunistic vulnerability includes:
  i) identifying a method for an attacker to compromise the first network node, and
  ii) identifying that the method to compromise would be available to the attacker at or after a future occurrence of the specific free event in the first network node; and
c) reporting, by the penetration testing system, the specific opportunistic vulnerability, wherein the reporting includes at least one of: (i) causing a display device to display a report including information about the specific opportunistic vulnerability, (ii) storing the report including information about the specific opportunistic vulnerability in a file, and (iii) electronically transmitting the report including information about the specific opportunistic vulnerability.

In some embodiments, the specific free event is an internal event of the first network node.

In some embodiments, the identifying of the specific opportunistic vulnerability includes executing the method for an attacker to compromise so as to validate that the first network node is compromised by the method for an attacker to compromise.

In some embodiments, the identifying of the specific opportunistic vulnerability includes validating that the first network node is compromised by the method of an attacker to compromise by simulating or otherwise evaluating the method for an attacker to compromise, without attempting to compromise the first network node.

In some embodiments, the message notifying the remote computing device of the specific occurrence of the specific free event in the first network node is sent by the reconnaissance agent software module installed on the first network node immediately after and in response to detecting the specific occurrence of the specific free event in the first network node.

In some embodiments, the message notifying the remote computing device of the specific occurrence of the specific free event in the first network node is sent by the reconnaissance agent software module installed on the first network node according to a schedule that is independent of (i) a time of occurrence of the specific occurrence of the specific free event in the first network node, and (ii) a time of detection of the specific occurrence of the specific free event in the first network node by the reconnaissance agent software module installed on the first network node.

In some embodiments, the specific free event is an event of physically attaching a physical device to the first network node.

In some embodiments, the specific free event is an attaching of a storage device to a port of the of the first network node. In some embodiments, the storage device is a removable USB storage device and the port is a USB port.

In some embodiments, the specific free event is an attaching of a communication device to a port of the first network node.

In some embodiments, the specific free event is an event of mounting a storage volume onto the first network node.

In some embodiments, the specific free event is an event of sending a network message out of the first network node, the sending caused by a command from a user of the first network node.

In some embodiments, the specific free event is a submission of a query from the first network node to a server.

In some embodiments, the specific free event is an event of sending a network message out of the first network node, the sending caused by an operating system of the first network node.

In some embodiments, the specific free event is an event of sending an ARP request message out of the first network node.

In some embodiments, the specific free event is an event of sending a network message out of the first network node, the sending caused by a software application installed on the first network node.

In some embodiments, the specific free event is an event of sending a WPAD message out of the first network node.

According to an aspect of an embodiment of the invention, there is provided a system for discovering and reporting a security vulnerability of a networked system, the networked system including a plurality of network nodes interconnected by one or more networks, each network node of the plurality of network nodes including one or more processors, and at least one network node of the plurality of network nodes is in electronic communication with a remote computing device, the remote computing device including one or more processors, the penetration testing system including:
  a) a reconnaissance agent non-transitory computer readable storage medium for instructions execution by the one or more processors of a first network node which is in electronic communication with the remote computing device, the reconnaissance agent non-transitory computer readable storage medium having stored:
    (1) instructions to detect at least some free events occurring in the first network node; and
    (2) instructions to transmit data about occurrences of the at least some free events to the remote computing device;
  b) a penetration testing non-transitory computer readable storage medium for instructions execution by the one or more processors of the remote computing device, the penetration testing non-transitory computer readable storage medium having stored:
    (1) instructions to receive a message from the first network node, the message notifying the remote computing device of a specific occurrence of a specific free event in the first network node, wherein the specific free event is one of:
      (a) sending a network message out of the first network node caused by a command from a user of the first network node;
      (b) sending a network message out of the first network node caused by an operating system of the first network node;
      (c) sending a network message out of the first network node caused by a software application installed on the first network node;
      (d) mounting a storage volume onto the first network node; and
      (e) physically attaching a physical device to the first network node;
    (2) instructions to identify, based on the received message, a specific opportunistic vulnerability with which the specific free event is associated, wherein the instructions to identify the specific opportunistic vulnerability include:
      (a) instructions to identify a method for an attacker to compromise the first network node, and
      (b) instructions to identify that the method to compromise would be available to the attacker at or after a future occurrence of the specific free event in the first network node; and
      (c) instructions to report the specific opportunistic vulnerability, the instructions to report including at least one of: (i) instructions to cause a display device to display information about the specific opportunistic vulnerability, (ii) instructions to store the information about the specific opportunistic vulnerability in a file, and (iii) instructions to electronically transmit the information about the specific opportunistic vulnerability.

In some embodiments, the specific free event is an internal event of the first network node.

In some embodiments, the instructions to identify the specific opportunistic vulnerability include instructions to execute the method for an attacker to compromise so as to validate that the first network node is compromised by the method for an attacker to compromise.

In some embodiments, the instructions to identify the specific opportunistic vulnerability include instructions to simulate or otherwise evaluate the method for an attacker to compromise so as to validate that the first network node is compromised by the method of an attacker to compromise, without attempting to compromise the first network node.

In some embodiments, the message notifying the remote computing device of the specific occurrence of the specific free event in the first network node is sent by executing the instructions to transmit by the one or more processors of the first network node immediately after and in response to detecting the specific occurrence of the specific free event in the one first network node.

In some embodiments, the message notifying the remote computing device of the specific occurrence of the specific free event in the first network node is sent by executing the instructions to transmit by the one or more processors of the first network node according to a schedule that is independent of (i) a time of occurrence of the specific occurrence of the specific free event in the first network node, and (ii) a time of detection of the specific occurrence of the specific free event in the first network node.

In some embodiments, the specific free event is an event of physically attaching a physical device to the first network node.

In some embodiments, the specific free event is an attaching of a storage device to a port of the of the first network node. In some such embodiments, the storage device is a removable USB storage device and the port is a USB port.

In some embodiments, the specific free event is an attaching of a communication device to a port of the first network node.

In some embodiments, the specific free event is an event of mounting a storage volume onto the first network node.

In some embodiments, the specific free event is an event of sending a network message out of the first network node, the sending caused by a command from a user of the first network node.

In some embodiments, the specific free event is a submission of a query from the first network node to a server.

In some embodiments, the specific free event is an event of sending a network message out of the first network node, the sending caused by an operating system of the first network node.

In some embodiments, the specific free event is an event of sending an ARP request message out of the first network node.

In some embodiments, the specific free event is an event of sending a network message out of the first network node, the sending caused by a software application installed on the first network node.

In some embodiments, the specific free event is an event of sending a WPAD message out of the first network node.

Unless otherwise defined, all technical and scientific terms used herein have the same meaning as commonly understood by one of ordinary skill in the art to which the invention pertains, unless explicitly defined in this application. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIG. 4 is a flow chart of a method for discovering and reporting a security vulnerability of a networked system according to an embodiment of the invention.

DESCRIPTION OF SOME EMBODIMENTS OF THE INVENTION

Figure 1A:
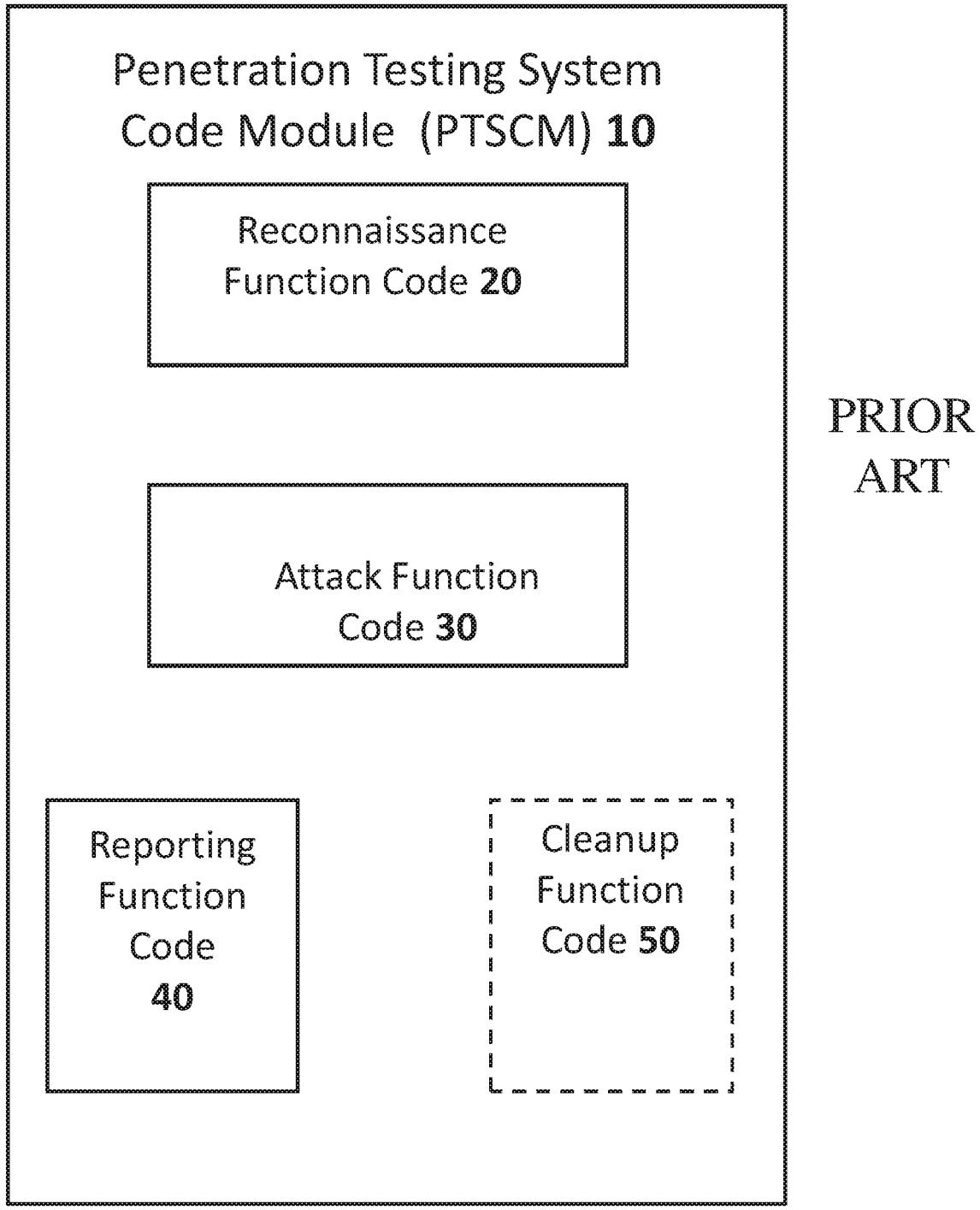
FIG. 1A (PRIOR ART) is a block diagram of code modules of a typical penetration testing system.
Figure 1B:
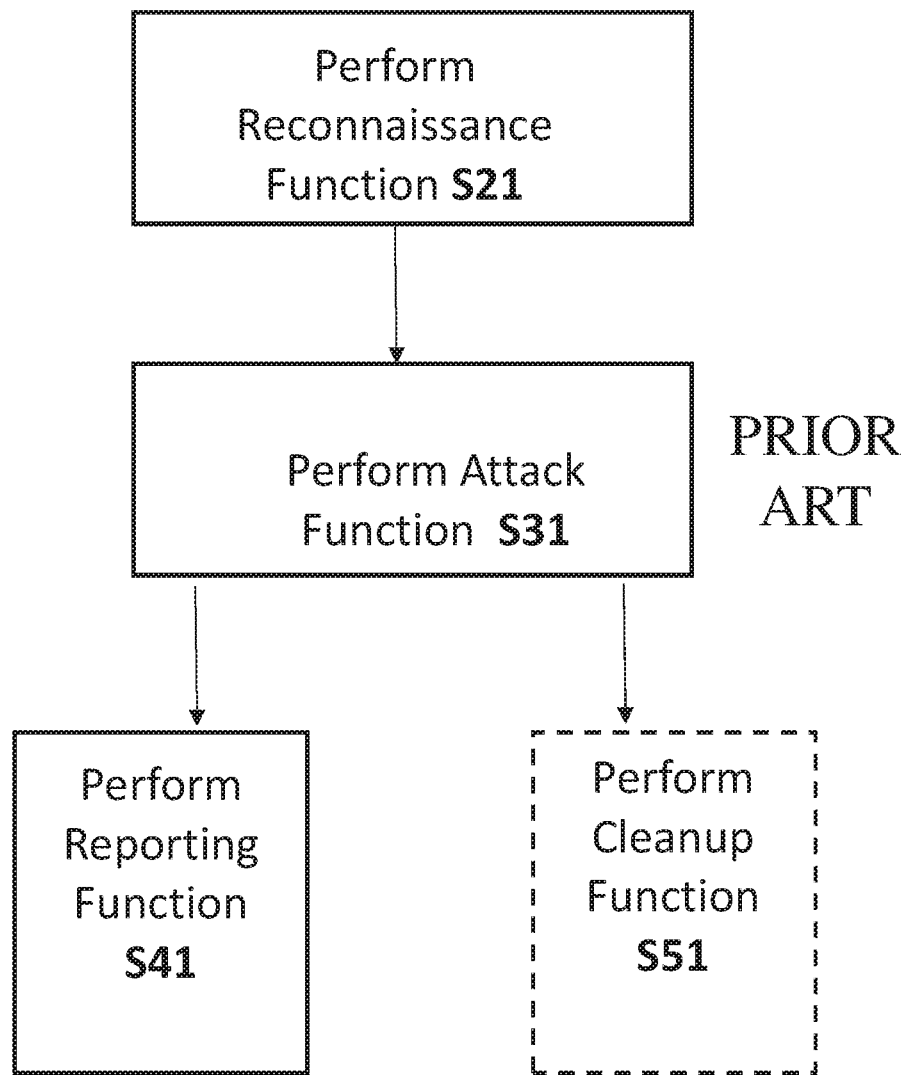
FIG. 1B (PRIOR ART) is a flow-chart related to the system of FIG. 1A.
Figure 2:
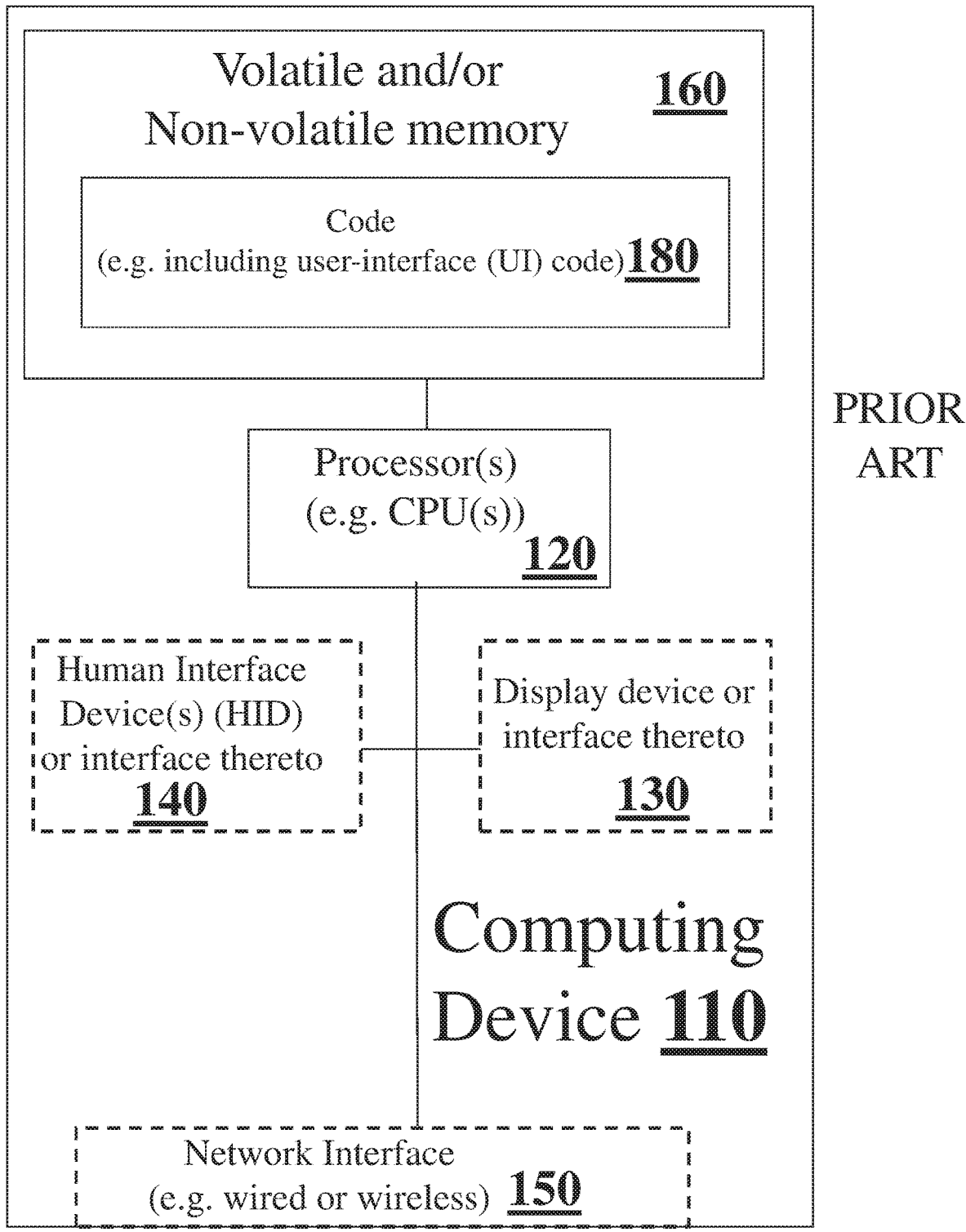
FIG. 2 (PRIOR ART) illustrates a prior art computing device.

The invention, in some embodiments, relates to penetration testing of a networked system, and specifically to detecting opportunistic vulnerabilities in a network node of a networked system.

The present disclosure should be interpreted according to the definitions in the "Definitions Section" at the end of the specification. In case of a contradiction between the definitions in the "Definitions Section" at the end of the specification and other sections of this disclosure, the "Definitions Section" at the end of the specification section should prevail.

In case of a contradiction between the "Definitions Section" at the end of the specification and a definition or a description in any other document, including in another document incorporated in this disclosure by reference, the "Definitions Section" at the end of the specification should prevail, even if the definition or the description in the other document is commonly accepted by a person of ordinary skill in the art.

The present invention provides a solution to the challenges discussed hereinabove with respect to the prior art, and specifically provides a penetration testing system that detects opportunistic vulnerabilities triggered by free events of a network node.

The proposed solution is an automatic penetration testing system that is capable of detecting opportunistic vulnerabilities, including ones associated with free events, and including ones associated with internal events. The solution is based on a reconnaissance client agent software module, which is installed in multiple nodes of the tested networked system and is capable of detecting and reporting events occurring in the hosting node. The events may be associated with opportunistic vulnerabilities, including when the events are free events and/or internal events. A block diagram of the penetration testing system of the proposed solution is shown and described hereinbelow with respect to FIG. 3.

U.S. Provisional Patent Application No. 62/451,850 and U.S. patent application Ser. Nos. 15/874,429 and 15/911,168, all titled "Penetration Testing of a Networked System" and assigned to the same assignee as the current application, disclose the use of reconnaissance client agents as part of an automated penetration testing system, and are both incorporated by reference with the same force and effect as if fully set forth herein.

A reconnaissance client agent according to the present invention is a software module that may be installed on a network node and may be executed by a processor of that network node, for partially or fully implementing the reconnaissance function of a penetration test. The reconnaissance agent must be able, when executed by a processor of the network node in which it is installed, to collect data about at least some of the events occurring in the network node. Such events may be internal events of the network node, or messages sent out of the network node or received by the network node. The reconnaissance client agent may be able to collect data about all types of internal events of its hosting network node. Additionally, the reconnaissance client agent may be able to collect other types of data regarding its hosting network node. The reconnaissance client agent may additionally be able to collect data about other network nodes or about other components of a networked system containing its hosting network node. The reconnaissance client agent can communicate with a server executing penetration testing code and can report any collected data to the server. The collected data may include (but is not necessarily limited to) data about multiple types of events occurring in the hosting node or in the network nodes to which the hosting node is connected.

The reconnaissance client agent of the present invention is an opportunistic reconnaissance agent, capable of detecting and reporting events associated with opportunistic vulnerabilities, including when the events are internal to the network node in which they occur. In some embodiments, it is also a free event reconnaissance agent, capable of detecting and reporting not only events occurring in the hosting network node that have external causes or triggers, but also free events that occur asynchronously relative to external causes and do not depend on any external causes.

Examples of events triggered by external causes include a network node receiving a network message from another network node, transmission of a network message by a network node as an answer to a previously-received incoming network message, etc. Examples of free events not triggered by external causes include insertion and removal of a USB storage device (which are also examples of internal events), transmission of a network message as a result of a manual user command (as in the case of submitting a query to a web server following a user's manual input), transmission of a network message as a result of an internal and independent process of the network node (as in the case of initiating a WPAD message in order to access a URL required by a locally running application), etc.

A free event reconnaissance agent must be able to detect at least some occurrences of at least one type of free events occurring in the network node in which it is installed.

The penetration testing system of the present invention further includes a penetration testing software module installed on a remote computing device. The remote computing device may be a dedicated server that executes only functions of penetrations testing, but may also be a shared computer that also performs other functions in addition to penetration testing.

The remote computing device, and consequently the penetration testing software module installed thereon, receive reports sent by all the reconnaissance client agents installed in all the network nodes included in the test. The penetration testing software module then identifies in the reports (among other things) events that are known to be potentially or unconditionally associated with opportunistic vulnerabilities, based on pre-defined rules. For each such opportunistic vulnerability, the penetration testing software module then determines whether it might be used to advantage by an attacker under the current circumstances in the currently tested networked system.

Such determination can be achieved by one or more of the following methods:

i. Actually generating the potential attack (for example by responding to an ARP request message with a false ARP reply message containing a false MAC address) and checking if the target node is indeed compromised.

ii. Simulating the potential attack without attempting to compromise the tested networked system. This can be done by fully simulating the tested network with both hardware and software simulation, or by using only software simulation.

iii. Evaluating the results of the potential attack without simulating it. For example, the penetration testing server may employ a pre-defined rule according to which, if a hostile node (already compromised by the attacker) is able to capture a WPAD request from another node and the browser submitting the request is Internet Explorer version 8.0 or earlier, it can be assumed that the attack would succeed.

Following a determination that a potential opportunistic vulnerability is indeed exploitable by attackers of the tested networked system, the penetration testing software module reports its findings to the penetration testing system's operator and/or to the tested networked system's administrator and/or to the CISO of the organization owning the tested networked system, possibly as part of a comprehensive report containing findings about multiple vulnerabilities, whether opportunistic or not. For each reported opportunistic vulnerability, the reported findings include at least an identification of the opportunistic vulnerability. Typically, the reported findings also include an identification of the event associated with the opportunistic vulnerability (regardless if it is a free event or not), and some information about the method by which an attacker might use that event to compromise the networked system.

The opportunistic reconnaissance agent of the present invention may achieve detection of free events, whether internal or not, by closely monitoring certain components of its hosting network node that are known to be potential sources of such events. Non-limiting examples of such elements include:

i. Input and output ports of the hosting network node. As explained above regarding the USB drive example, insertion (and sometimes also removal) of a device into/from an interface port might create an opportunity for compromising the hosting node. Therefore, the opportunistic reconnaissance agent of the present invention looks for such events.

This may be accomplished, for example, by capturing the interrupt generated by physical insertion or removal of devices, identifying the details of the event which are of use to the penetration testing reconnaissance agent, and then dispatching the interrupt to an appropriate software driver or handler whose function is to handle that interrupt under normal circumstances (when the reconnaissance agent is not installed in the network node). Many operating systems provide well-documented methods for implementing interrupt capturing, and chaining of interrupt handlers, as required for implementing the above method.

Even without using interrupt capturing, detection of insertion of a USB drive or of any other type of removable drive can be achieved using any of the well-known methods in the following non-exhaustive list:

a. Enumerating of all mounted storage volumes or all physically-attached drives of the type of the monitored port, by periodically submitting polling requests. On Windows operating systems, this can be done with a WIN32 API call, with a WMI (Windows Management Instrumentation) query, with a PowerShell script, or in any other way.

b. Registering for event notification when a new volume is mounted or physically attached (which is functionally equivalent to the interrupt capturing method described above). On Windows operating systems, this can be done with a WIN32 API call, with a WMI query, or in any other way.

ii. Receipt of incoming network messages, and transmission of outgoing network messages. As explained above with respect to the ARP and WPAD protocols examples, transmissions of certain types of messages of certain network protocols from a network node might create opportunities for compromising that node. Similarly, receipt of certain messages of certain network protocols by a network node might also create opportunities for compromising that node. For example, a message of a certain type of a certain protocol might be known to cause a buffer overflow in the network driver in case it is longer than a given length, which buffer overflow might then be used by an attacker to compromise the network node.

Therefore, the opportunistic reconnaissance agent of the present invention looks for events of incoming and outgoing messages, and then determines whether any detected message satisfies the conditions making it an event that may (potentially or unconditionally) trigger an opportunistic vulnerability.

The tested conditions may relate to the length of the message, its protocol, its sender, or any other of its features.

Monitoring for relevant network messages may be carried out using methods that are well known in the art and are similar to the methods mentioned above in the USB drive example—the reconnaissance agent may insert itself into the chain of handlers associated, by the local operating system, with handling network messages. This ensures that the reconnaissance agent achieve its goal of detecting messages of interest to penetration testing without disturbing in any way the normal operation of its hosting node.

To be more specific, detection of ARP or WPAD messages can be accomplished using any sniffer or packet filter, after configuring it with a specific filter that recognizes ARP or WPAD packets. The most common packet filter implementations in Windows operating systems are those using the PCAP library. On the Linux operating system, one can use the TCPDUMP utility with the appropriate filter.

Thus, the penetration testing system of the present invention is superior to prior art penetration testing systems in being able to detect a variety of opportunistic vulnerabilities, including opportunistic vulnerabilities associated with free events and opportunistic vulnerabilities associated with events that are internal events of their corresponding network nodes. This is achieved by using an opportunistic reconnaissance agent installed on the network nodes included in the test, which detects and reports events potentially or unconditionally associated with opportunistic vulnerabilities. The detected events may include free events potentially or unconditionally associated with opportunistic vulnerabilities, and may also include internal events of the node hosting the opportunistic reconnaissance agent potentially or unconditionally associated with opportunistic vulnerabilities.

The identified events that are potentially or unconditionally associated with opportunistic vulnerabilities are reported to the penetration testing software module, which determines whether, under the current circumstances, a given event is indeed associated with an opportunistic vulnerability. If so, the vulnerability, and in some embodiments also the event associated therewith, are reported by the penetration testing system.

It should be noted that the reconnaissance agent cannot always know whether an identified event is associated with an opportunistic vulnerability or not, as this might require knowledge not in the possession of the agent. For this reason, the reconnaissance agent of the present invention is said to detect "events potentially or unconditionally associated with opportunistic vulnerabilities". For example, a reconnaissance agent detecting sending a query from its hosting node to a web server cannot tell whether this event is currently associated with an actual opportunistic vulnerability. This question depends on whether the server to which the query is addressed is currently compromised by the attacker or not. If the server is currently compromised, then the event is currently associated with a real vulnerability that can be exploited in the next occurrence of such a query event. Otherwise, if the server is currently not compromised, then the event is currently not associated with a real vulnerability.

Therefore, it is essential to have a separation between the detection of events and the identification of the currently relevant opportunistic vulnerabilities—the former is accomplished within the network nodes by the reconnaissance agents, while the latter is accomplished in the remote computing device by the penetration testing software module, that is in possession of the knowledge required for determining whether a potential vulnerability is indeed a real vulnerability under the current circumstances.

Obviously, in some cases, the reconnaissance agent can tell that a given event is associated with an opportunistic vulnerability, because such determination does not require extra knowledge not available to the agent (e.g. it is an unconditional association). In such a case the reconnaissance agent may have reported the associated vulnerability and not just the event. However, in order for all opportunistic vulnerabilities to be handled the same way, the reconnaissance agent of the proposed penetration testing system reports only the identified events for all events and leaves the determination of the relevant opportunistic vulnerabilities to the penetration testing software module.

Figure 3:
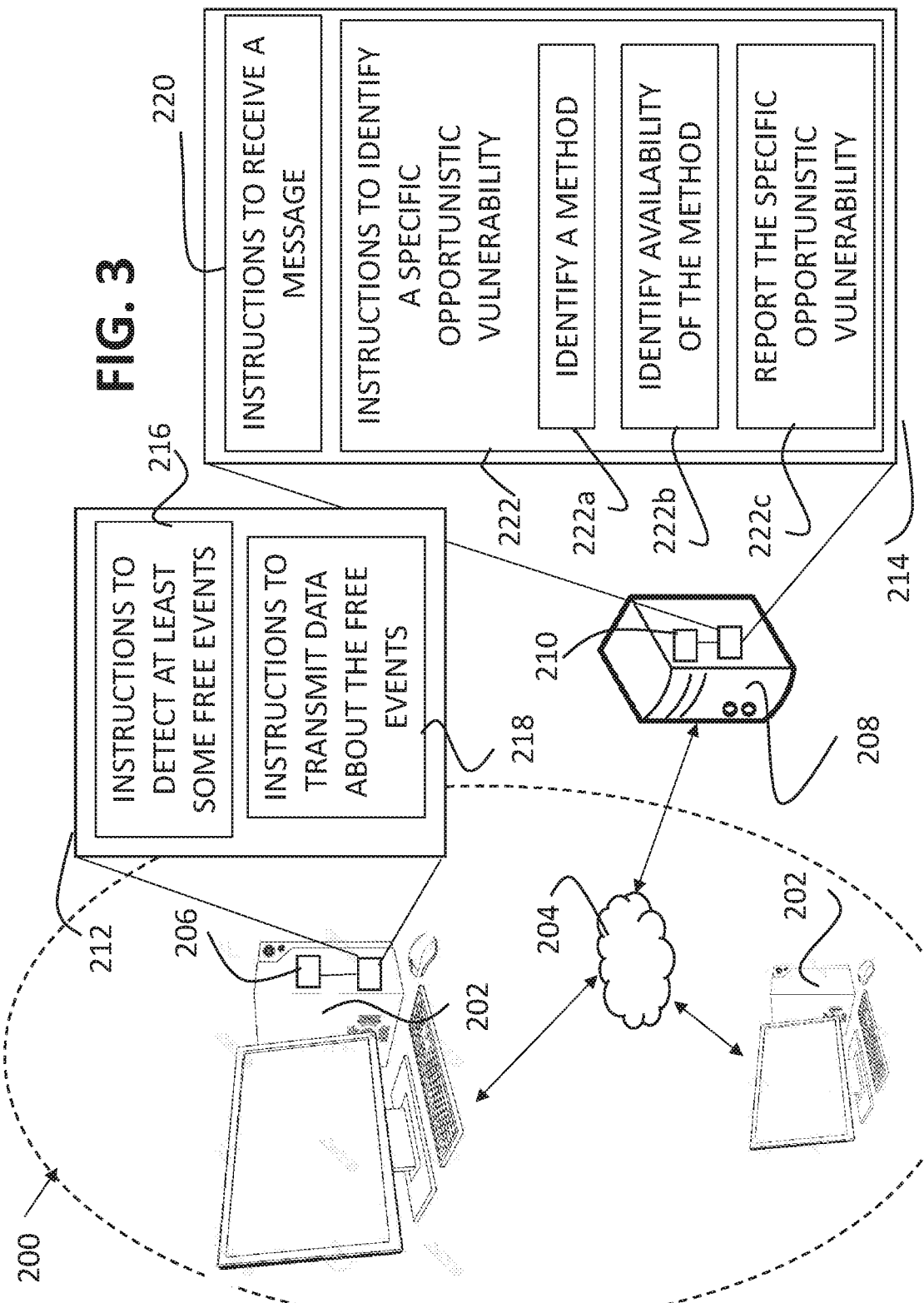
FIG. 3 is a schematic illustration of a networked system including a system for discovering and reporting a security vulnerability of the networked system, according to an embodiment of the invention.

Reference is now made to FIG. 3, which is a schematic illustration of a networked system 200 including a system for discovering and reporting a security vulnerability of the networked system, according to an embodiment of the present invention.

As seen in FIG. 3, the networked system 200 (indicated by a dashed oval in FIG. 3) includes a plurality of network nodes 202 interconnected by one or more networks 204. For clarity, details of the structure of the network nodes 202 are illustrated and described with respect to a single network node 202, but may be equally applicable to all other network nodes.

As seen, the network node 202 includes one or more processors 206, illustrated in FIG. 3 as a single processor, and is in electronic communication, for example via network (s) 204, with a remote computing device 208, which includes one or more processors 210.

A system for discovering and reporting a security vulnerability of the networked system 200 includes a reconnaissance agent storage medium 212, and a penetration testing storage medium 214.

The reconnaissance agent storage medium 212 may be a non-transitory computer readable storage medium and includes instructions to be executed by processor(s) 206 of the network node 202 on which the reconnaissance agent in installed and which is in electronic communication with remote computing device 208.

Specifically, reconnaissance agent storage medium 212 has stored:

instructions 216 to detect at least some free events occurring in network node 202; and instructions 218 to transmit data about occurrences of the detected free events to remote computing device 208.

In some embodiments, the instructions 216 include instructions to detect at least some internal events occurring in network node 202.

The penetration testing storage medium 214 may be a non-transitory computer readable storage medium, and includes instructions to be executed by processor(s) 210 of remote computing device 208. Specifically, penetration testing storage medium 214 has stored:

instructions 220 to receive a message from network node 202, the message notifying remote computing device 208 of a specific occurrence of a specific free event in network node 202; and instructions 222 to identify, based on the received message, a specific opportunistic vulnerability with which the specific free event is associated.

In some embodiment, the specific free event is one of:
a) sending a network message out of network node 202, caused by a command from a user of the network node, by an operating system of the network node, and/or by a software application installed on the first network node;
b) mounting a storage volume onto network node 202; and
c) physically attaching a physical device to network node 202.

In some embodiments, the instructions 222 to identify a specific opportunistic vulnerability, include:

instructions 222a to identify a method for an attacker to compromise network node 202;

instructions 222b to identify that the method to compromise would be available to the attacker at or after a future occurrence of the specific free event in network node 202; and instructions 222c to report the specific opportunistic vulnerability, including at least one of: (i) instructions to cause a display device to display information about the specific opportunistic vulnerability, (ii) instructions to store the information about the specific opportunistic vulnerability in a file, and (iii) instructions to electronically transmit the information about the specific opportunistic vulnerability.

In some embodiments, the penetration testing is an actual attack penetration testing, and instructions 222 include instructions to execute the method for an attacker to compromise network node 202, so as to validate that network node 202 is compromised by this method.

In other embodiments, the penetration testing is a simulated penetration testing, and instructions 222 include instructions to simulate or otherwise evaluate the method for an attacker to compromise network node 202, so as to validate that network node 202 would be compromised by this method, without attempting to actually compromise network node 202.

Reference is now additionally made to FIG. 4, which is a flow chart of a method for discovering and reporting a security vulnerability of a networked system, such as networked system 200 of FIG. 3, according to an embodiment of the invention.

At step 300, the remote computing device 208, and specifically the penetration testing software module installed therein, receives a message from network node 202, and specifically from the reconnaissance agent software module installed thereon, for example by carrying out instructions 220 of penetration testing memory 214. The message notifies the penetration testing module of a specific occurrence of a specific free event in the network node 202, for example as detected by carrying out instructions 216 and transmitted by carrying out instructions 218 stored in reconnaissance agent memory 212.

In some embodiments, the specific free event is an internal event of network node 202.

In some embodiments, the specific free event includes sending a network message out of network node 202. Such sending may be caused by a command from a user of network node 202, by an operating system of network node 202, or by a software application installed on network node 202.

As discussed hereinabove, such sending of a network message out of network node 202 may include submission of a query from the network node 202 to a server, sending an ARP request message out of network node 202, or sending a WPAD message out of network node 202.

In some embodiments, the specific free event includes mounting a storage volume onto network node 202.

In some embodiments, the specific free event includes physically attaching a physical device to network node 202. The physical device may be a storage device, such as attaching a removable USB storage device to a USB port of the network node 202, and may be a communication device attached to a suitable port of network node 202.

In some embodiments, the message is sent by the reconnaissance agent software module of network node 202, immediately after and in response to detection of the specific occurrence of the specific free event in network mode 202.

For the purposes of the present application and claims, the term "immediately after" relates to sending of the message being initiated no later than 100 milliseconds from completing the detection. If delays occur due to the communication hardware or bandwidth limits of the system, the message is still considered sent immediately after detection of the specific occurrence of the free event, even if the message is received in the remote computing device several minutes after such detection.

In some embodiments, the message is sent by the reconnaissance agent software module of network node 202, and is received by remote computing device 208, according to a schedule, that is independent of a time of occurrence of the specific free event, and of a time of detection of the specific occurrence of the free event by the reconnaissance agent software module.

In some embodiments, the schedule may be a periodic schedule, for example sending messages once an hour relating to all free events occurring and/or detected by the reconnaissance agent module during the passing hour.

In other embodiments, the schedule may be non periodic, or intermittent. For example, the schedule may dictate that messages are sent every time a user logs into the workstation (in addition to reporting every round hour), or that messages are sent at predetermined times that are not at equal durations from one another (e.g. reporting more frequently during working hours).

At step 302, the penetration testing software module installed on remote computing device 208 identifies, based on the received message, a specific opportunistic vulnerability with which the specific free event specified in the message is associated.

In some embodiments, such identification includes:

At step 304, identifying a method for an attacker to compromise network node 202, for example by carrying out instructions 222a; and At step 306, identifying that such method, identified in step 304, would be available for an attacker at, or after, a future occurrence of the specific free event in network node 202, for example by carrying out instructions 222b.

In some embodiments, in which the penetration testing system is an actual attack penetration testing system, step 306 includes executing the method identified in step 304, so as to validate that network node 202 is compromised by this method.

In some embodiments, in which the penetration testing system is a simulating penetration testing system, step 306 includes validating that network node 202 would be compromised by the method identified in step 304, by simulating or otherwise evaluating this method, without attempting to actually compromise the network node.

Subsequently, at step 308, the penetration testing software module installed on remote computing device 208 reports the specific opportunistic vulnerability, by causing a display device to display a report including information about the specific opportunistic vulnerability, storing the report including information about the specific opportunistic vulnerability in a file, and/or electronically transmitting the report including information about the specific opportunistic vulnerability.

Definitions

This disclosure should be interpreted according to the definitions below. In case of a contradiction between the definitions in this Definitions section and other sections of this disclosure, this section should prevail.

In case of a contradiction between the definitions in this section and a definition or a description in any other document, including in another document included in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.
2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.
3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.
4. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.
5. "module"—A portion of a system that implements a specific task. A module may be composed of hardware, software or any combination of both. For example, in a module composed of both hardware and software, the hardware may include a portion of a computing device, a single computing device or multiple computing devices, and the software may include software code executed by the portion of the computing device, by the single computing device or by the multiple computing devices. A computing device associated with a module may include one or more processors and computer readable storage medium (non-transitory, transitory or a combination of both) for storing instructions or for executing instructions by the one or more processors.
6. "network node of a networked system" or "node of a networked system"—Any computing device or peripheral device that belongs to the networked system.
7. "security vulnerability of a network node" or "vulnerability of a network node"—A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, and the like.

A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition of the networked system).
8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like.

A weakness that allows an attacker to compromise a networked system only conditionally, depending on current conditions in the networked system, is still a vulnerability of the networked system, but may also be referred to as a "potential vulnerability of the networked system". For example, if a network node of the networked system has a potential vulnerability then that vulnerability can be said to be a vulnerability of the networked system, and can also be said to be a potential vulnerability of the networked system.

9. "validating a vulnerability" or "validating a potential vulnerability" (for a given network node or for a given networked system)—Verifying that the vulnerability compromises the given network node or the given networked system under the conditions currently existing in the given network node or the given networked system.

The validation of the vulnerability may be achieved by actively attempting to compromise the given network node or the given networked system and then checking if the compromising attempt was successful. Such validation is referred to as "active validation".

Alternatively, the validation of the vulnerability may be achieved by simulating the exploitation of the vulnerability or by otherwise evaluating the results of such exploitation without actively attempting to compromise the given network node or the given networked system. Such validation is referred to as "passive validation".

10. "vulnerability management"—A cyclical practice of identifying, classifying, remediating, and mitigating vulnerabilities of network nodes in a networked system.

11. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported.

Unlike a vulnerability management process, which operates at the level of isolated vulnerabilities of individual network nodes, a penetration test may operate at a higher level which considers vulnerabilities of multiple network nodes that might be jointly used by an attacker to compromise the networked system.

A penetration testing process involves at least the following functions: (i) a reconnaissance function, (ii) an attack function, and (iii) a reporting function. It should be noted that the above functions do not necessarily operate sequentially according to the above order, but may operate in parallel or in an interleaved mode.

Unless otherwise explicitly specified, a reference to penetration testing should be understood as referring to automated penetration testing.

12. "automated penetration testing"—Penetration testing in which at least one of the reconnaissance function, the attack function and the reporting function is at least partially automated.

13. "penetration testing system"—A system capable of performing penetration testing, regardless if composed of hardware, software or combination of both.

14. "reconnaissance function" or "recon function"—The function in a penetration testing process that handles collection of data about the tested networked system.

The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system.

The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

15. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any.

The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system.

The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system.

Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

16. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (iii) electronically transmitting a report including information about the results of the penetration testing.

The functionality of a reporting function may be implemented by software executing in a remote computing device, for example in the computing device implementing the attack function of the penetration testing.

17. "recovery function" or "clean-up function"—The function in a penetration testing process that handles cleaning-up after a penetration test. The recovery includes undoing any operation done during the penetration testing process that results in compromising the tested networked system.

The functionality of a recovery function may be implemented by any combination of (i) software executing in a remote computing device, for example in the computing device implementing the attack function of the penetration testing, (ii) an attack agent software module executing in one or more network nodes of the tested networked system.

18. "a campaign of penetration testing" or "penetration testing campaign"—A specific run of a specific test of a specific networked system by the penetration testing system.
19. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.
20. "attacker" or "threat actor"—An entity, whether a single person, a group of persons or an organization, that might conduct an attack against a networked system by penetrating it for uncovering its security vulnerabilities and/or for compromising it.
21. "penetration testing by simulation" or "simulated penetration testing"—Penetration testing in which (i) the functionality of the reconnaissance function is fully implemented by software executing by a remote computing device and/or by hardware and/or software simulating or duplicating the tested networked system, where the remote computing device may probe the tested networked system for the purpose of collecting data about it, as long as this is done without risking compromising the tested networked system, and (ii) the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.
22. "penetration testing by actual attack" or "actual attack penetration testing" or "penetration testing by actual exploit" or "actual exploit penetration testing"—Penetration testing in which (i) the functionality of the reconnaissance function is fully implemented by (A) software executing in a remote computing device, where the remote computing device may probe the tested networked system for the purpose of collecting data about it even if this risks compromising the tested networked system, and/or by (B) software executing in one or more network nodes of the tested networked system that analyzes network traffic and network packets of the tested networked system for collecting data about it, and (ii) the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.
23. "penetration testing by reconnaissance agents" or "reconnaissance agent penetration testing"—Penetration testing in which (i) the functionality of the reconnaissance function is at least partially implemented by a reconnaissance agent software module installed and executed in each one of multiple network nodes of the tested networked system, where the data collected by at least one instance of the reconnaissance agent software module includes internal data of the network node in which it is installed, and the data collected by at least one instance of the reconnaissance agent software module is at least partially collected during the penetration testing process, and (ii) the methods used by the attack function are such that whenever there is a need to verify whether a setting, a mode or a state of a network node or of a hardware or software component of a network node can be changed in a way that compromises the tested networked system, this is done by simulating the effects of the change or by otherwise evaluating them without risking compromising the tested networked system.
24. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Additionally, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.
25. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.
26. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system.

The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.

27. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.

28. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event.

It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".

29. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.

30. "internal factual data of/in a network node" or "internal facts of a network node"—Facts related to the network node which can only be directly found by code executing by a processor of the network node. Examples of factual data of a network node are the version of the firmware of a solid-state drive installed in the network node, the hardware version of a processor of the network node, and the amount of free space in a local disk of the network node.

31. "resource of a networked system"—A file in a network node of the networked system, a folder in a network node of the networked system, credentials of a user of the networked system, a peripheral device of a network node of the networked system, or a peripheral device directly attached to a network of the networked system.

32. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.

33. "ARP spoofing"—a technique for compromising a target network node in which an attacker sends a false Address Resolution Protocol (ARP) reply message to the target network node. The aim is to associate an attacker's MAC address (either a MAC address of the node sending the false ARP reply message or a MAC address of another node controlled by the attacker) with the IP address of another host, such as the default gateway, causing any traffic sent by the target node and meant for that IP address to be sent to the attacker instead. ARP spoofing may allow an attacker to intercept data frames on a network, modify the traffic, or stop all traffic to a certain node. Often the attack is used as an opening for other attacks, such as denial-of-service, man-in-the-middle, or session-hijacking attacks.

34. "denial-of-service attack"—a cyber-attack where an attacker seeks to make a service provided by a network node to other network nodes unavailable to its intended users either temporarily or indefinitely. The denial-of-service attack may be accomplished by flooding the node providing the targeted service with superfluous requests in an attempt to overload it and prevent some or all legitimate requests from being fulfilled. Alternatively, the denial-of-service attack may be accomplished by causing some or all of the legitimate requests addressed to the targeted service to not reach their destination.

35. "man-in-the-middle attack"—a cyber-attack where an attacker secretly relays and possibly alters the communication between two network nodes who believe they are directly communicating with each other. One example of man-in-the-middle attacks is active eavesdropping, in which the attacker makes independent connections with the victims and relays messages between them to make them believe they are communicating directly with each other, when in fact the entire communication session is controlled by the attacker. The attacker must be able to intercept all relevant messages passing between the two victims and inject new ones.

36. "session-hijacking attack"—a cyber-attack where a valid communication session between two network nodes in a networked system is used by an attacker to gain unauthorized access to information or services in the networked computer system.
37. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.
38. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.
39. "administrator of a network node"—Any person that is authorized, among other things, to define or change at least one rule controlling at least one of an access right, a permission, a priority and a configuration in the network node.
40. "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.
41. "remote computing device" (with respect to a given networked system)—A computing device that executes software implementing part or all of the penetration testing software module that is used for testing the given networked system.

A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system.

A remote computing device may (i) be a dedicated computing device that is dedicated only to doing penetration testing, or (ii) also implement other functionality not directly related to penetration testing.

A remote computing device is not limited to be a single physical device with a single processing unit. It may be implemented by multiple separate physical devices packaged in separate packages that may be located at different locations. Each of the separate physical devices may include one or multiple processing units.

A remote computing device may be (i) a physical computing device, or (ii) a virtual machine running inside a physical computing device on top of a hosting operating system.
42. "free event of/in a network node"—An event occurring in the network node which is initiated in and by the network node and is not directly caused or triggered by an entity outside that network node. A free event of a network node may be initiated by a user of the network node, by an operating system of the network node or by an application executing on the network node. A free event of a network node may be either an internal event or a non-internal event of the network node. Examples of free events of a network node are the insertion or removal of a USB removable storage device into/from a socket of the network node, the sending of a query to a web server in response to a user manually entering the query, the sending of an ARP request message by the network node while initializing the network node after manually powering it up, and the sending of a WPAD message by the network node in response to manually typing by the user of a URL into a browser's address input box. Examples of events of a network node that are not free events are the receiving of a network message by the network node, and the sending of a network message by the network node that is done in response to receiving another network message from another network node.
43. "free event reconnaissance agent"—A reconnaissance agent that is capable of detecting and reporting at least some occurrences of at least one type of free events occurring in a network node in which it is installed. Note that it is not necessary for a free event reconnaissance agent to be able to detect each and every type of free event, and not even all occurrences of the types of free events it does detect. For example, a reconnaissance agent that only detects insertions of USB drives but does not detect any transmissions of network nodes, and additionally detects only insertions of USB drives into a first USB port but not into a second USB port of its hosting node, or randomly detects only 50% of the insertions of USB drives into USB ports of its hosting node, is still considered a free event reconnaissance agent.
44. "opportunistic security vulnerability" or "opportunistic vulnerability"—A security vulnerability that becomes available to attackers only after an occurrence of a specific event. In many cases an opportunistic security vulnerability remains available to attackers only for a limited time interval, and once that time interval is over, the vulnerability is no longer available to them. However, in some cases an opportunistic vulnerability remains available to attackers with no time limit.

In some cases the availability of the vulnerability to the attackers is created by the occurrence of the event, for example when a transmission of a WPAD network message creates the weakness making an attack possible. In other cases, the availability of the vulnerability to attackers is not created by the occurrence of the event. The vulnerability exists beforehand and the occurrence of the event only makes it known to the attackers. For example, an event of inserting a USB drive into a network node when that USB drive was previously inserted into an already compromised node only exposes a method for compromising the network node but does not change or create anything in the networked system.

A specific event that triggers the availability of a specific opportunistic vulnerability is said to be an event "associated with" that specific opportunistic vulnerability, and the specific opportunistic vulnerability is said to be an opportunistic vulnerability "associated with" that specific event.

A specific event that triggers the availability of a specific opportunistic vulnerability may trigger that availability unconditionally. That is—the specific opportunistic vulnerability will become available to attackers following every occurrence of the specific event. However, it may also be the case that the specific event might sometimes trigger the specific opportunistic vulnerability and sometimes not trigger it, depending on some condition. For example, an event of submitting a query to web server in the networked system may or may not cause a vulnerability of being "poisoned" by a malicious HTML answer page, depending on the condition of whether that web server is currently compromised by the attacker or not. An event is said to be associated with an opportunistic vulnerability and an opportunistic vulnerability is said to be associated with an event if the event may trigger the opportunistic vulnerability, regardless if the triggering relation is conditional or unconditional. In the first case we say that the event is "unconditionally associated" with the opportunistic vulnerability, and in the second case we say that the event is "potentially associated" or "conditionally associated" with the opportunistic event. As a result of the above, detecting an event that is associated with an opportunistic vulnerability does not necessarily imply that the vulnerability will be available to the attacker in a future occurrence of the event. In order to conclude that the opportunistic vulnerability will indeed be available to the attacker for a future occurrence of the event, it must be determined that the condition enabling the triggering of the vulnerability by the event (if such exists) is satisfied.

A time interval during which a specific opportunistic vulnerability is available to attackers (if such limiting time interval exists for that specific opportunistic vulnerability) is said to be a time interval "associated with" that specific opportunistic vulnerability.

A time interval associated with an opportunistic vulnerability may be of a fixed length for all occurrences of the event associated with that opportunistic vulnerability, or it may have different length in different occurrences of the associated event and be terminated by the occurrence of another event that makes the use of the vulnerability to attackers no longer possible. An example of the latter case is the vulnerability created by sending an ARP request message, in which case a response to the message by an ARP reply message sent by the true addressee of the request closes the window of opportunity for attackers to exploit the ARP spoofing vulnerability created by sending the ARP request message. It should be noted that it is not always the case that a time interval associated with an opportunistic vulnerability that is terminated by a terminating event will actually be terminated by the terminating event in a specific occurrence of the opportunistic vulnerability—in the above ARP message example it might happen that no valid ARP reply message is ever received and the window of opportunity for attackers remains open for a long time (most probably until a timeout mechanism in the network node that sent the ARP request message terminates the wait for a reply, thus closing the window of opportunity).

Examples of opportunistic vulnerabilities are the above mentioned ability of an attacker to take advantage of a sending of an ARP request message by a network node for executing an ARP spoofing attack, the ability of an attacker to take advantage of a sending of a WPAD message by a network node for executing a session-hijacking attack, and the ability of an attacker to take advantage (under certain conditions) of an insertion of a USB removable storage device into a network node for compromising the network node.

45. "opportunistic reconnaissance agent"—A reconnaissance agent that is capable of detecting and reporting occurrences of at least one event occurring in a network node in which it is installed that is associated with an opportunistic vulnerability.

46. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method for discovering and reporting a security vulnerability of a networked system by a penetration testing system, the networked system comprising a plurality of network nodes interconnected by one or more networks, wherein the penetration testing system comprises (i) a reconnaissance agent software module, that (A) can be installed on one or more network nodes of the plurality of network nodes, and (B) when installed on a network node of the plurality of network nodes, is operable to detect one or more free events occurring in the network node on which it is installed and to transmit data about occurrences of one or more of the detected free events to a remote computing device, and (ii) a penetration testing software module installed on the remote computing device and operable to communicate with at least one of the plurality of network nodes on which the reconnaissance agent software module is installed, the method comprising:
a) receiving, by the penetration testing software module installed on the remote computing device, a message from a first network node on which the reconnaissance agent software module is installed, the message notifying the remote computing device of a specific occurrence of a specific free event in the first network node, wherein the message originates from the reconnaissance agent software module installed on the first network node, and wherein the specific free event is one of:
   i) sending a network message out of the first network node caused by a command from a user of the first network node;
   ii) sending a network message out of the first network node caused by an operating system of the first network node;
   iii) sending a network message out of the first network node caused by a software application installed on the first network node;
   iv) mounting a storage volume onto the first network node; and
   v) physically attaching a physical device to the first network node;
b) identifying, by the penetration testing software module and based on the received message, a specific opportunistic vulnerability with which the specific free event is associated, wherein the identifying of the specific opportunistic vulnerability comprises:
   i) identifying a method for an attacker to compromise the first network node, and
   ii) identifying that the method to compromise would be available to the attacker at or after a future occurrence of the specific free event in the first network node; and
c) reporting, by the penetration testing system, the specific opportunistic vulnerability, wherein the reporting comprises at least one of: (i) causing a display device to display a report including information about the specific opportunistic vulnerability, (ii) storing the report including information about the specific opportunistic vulnerability in a file, and (iii) electronically transmitting the report including information about the specific opportunistic vulnerability.

2. The method of claim 1, wherein the specific free event is an internal event of the first network node.

3. The method of claim 1, wherein the identifying of the specific opportunistic vulnerability comprises executing the method for an attacker to compromise so as to validate that the first network node is compromised by the method for an attacker to compromise.

4. The method of claim 1, wherein the identifying of the specific opportunistic vulnerability comprises validating that the first network node is compromised by the method of an attacker to compromise by simulating or otherwise evaluating the method for an attacker to compromise, without attempting to compromise the first network node.

5. The method of claim 1, wherein the message notifying the remote computing device of the specific occurrence of the specific free event in the first network node is sent by the reconnaissance agent software module installed on the first network node immediately after and in response to detecting the specific occurrence of the specific free event in the first network node.

6. The method of claim 1, wherein the message notifying the remote computing device of the specific occurrence of the specific free event in the first network node is sent by the reconnaissance agent software module installed on the first network node according to a schedule that is independent of (i) a time of occurrence of the specific occurrence of the specific free event in the first network node, and (ii) a time of detection of the specific occurrence of the specific free event in the first network node by the reconnaissance agent software module installed on the first network node.

7. The method of claim 1, wherein the specific free event is an event of physically attaching a physical device to the first network node.

8. The method of claim 7, wherein the specific free event is an attaching of a storage device to a port of the of the first network node.

9. The method of claim 8, wherein the storage device is a removable USB storage device and the port is a USB port.

10. The method of claim 7, wherein the specific free event is an attaching of a communication device to a port of the first network node.

11. The method of claim 1, wherein the specific free event is an event of mounting a storage volume onto the first network node.

12. The method of claim 1, wherein the specific free event is an event of sending a network message out of the first network node, the sending caused by a command from a user of the first network node.

13. The method of claim 1, wherein the specific free event is a submission of a query from the first network node to a server.

14. The method of claim 1, wherein the specific free event is an event of sending a network message out of the first network node, the sending caused by an operating system of the first network node.

15. The method of claim 1, wherein the specific free event is an event of sending an ARP request message out of the first network node.

16. The method of claim 1, wherein the specific free event is an event of sending a network message out of the first network node, the sending caused by a software application installed on the first network node.

17. The method of claim 1, wherein the specific free event is an event of sending a WPAD message out of the first network node.

18. A system for discovering and reporting a security vulnerability of a networked system, the networked system comprising a plurality of network nodes interconnected by one or more networks, each network node of the plurality of network nodes including one or more processors, and at least one network node of the plurality of network nodes is in electronic communication with a remote computing device, the remote computing device including one or more processors, the system comprising:
a) a reconnaissance agent non-transitory computer readable storage medium for instructions execution by the one or more processors of a first network node which is in electronic communication with the remote computing device, the reconnaissance agent non-transitory computer readable storage medium having stored:
   (1) instructions to detect one or more free events occurring in the first network node; and
   (2) instructions to transmit data about occurrences of one or more of the detected free events to the remote computing device;
b) a penetration testing non-transitory computer readable storage medium for instructions execution by the one or more processors of the remote computing device, the penetration testing non-transitory computer readable storage medium having stored:

(1) instructions to receive a message from the first network node, the message notifying the remote computing device of a specific occurrence of a specific free event in the first network node, wherein the specific free event is one of:
  (a) sending a network message out of the first network node caused by a command from a user of the first network node;
  (b) sending a network message out of the first network node caused by an operating system of the first network node;
  (c) sending a network message out of the first network node caused by a software application installed on the first network node;
  (d) mounting a storage volume onto the first network node; and
  (e) physically attaching a physical device to the first network node;
(2) instructions to identify, based on the received message, a specific opportunistic vulnerability with which the specific free event is associated, wherein the instructions to identify the specific opportunistic vulnerability comprise:
  (a) instructions to identify a method for an attacker to compromise the first network node, and
  (b) instructions to identify that the method to compromise would be available to the attacker at or after a future occurrence of the specific free event in the first network node; and
  (c) instructions to report the specific opportunistic vulnerability, the instructions to report comprising at least one of: (i) instructions to cause a display device to display information about the specific opportunistic vulnerability, (ii) instructions to store the information about the specific opportunistic vulnerability in a file, and (iii) instructions to electronically transmit the information about the specific opportunistic vulnerability.

19. The system of claim 18, wherein the specific free event is an internal event of the first network node.

20. The system of claim 18, wherein the instructions to identify the specific opportunistic vulnerability comprise instructions to execute the method for an attacker to compromise so as to validate that the first network node is compromised by the method for an attacker to compromise.

21. The system of claim 18, wherein the instructions to identify the specific opportunistic vulnerability comprise instructions to simulate or otherwise evaluate the method for an attacker to compromise so as to validate that the first network node is compromised by the method of an attacker to compromise, without attempting to compromise the first network node.

* * * * *